US008647591B2

(12) United States Patent
Chung et al.

(10) Patent No.: US 8,647,591 B2

(45) Date of Patent: Feb. 11, 2014

(54) MICROARRAY REACTION DEVICE AND METHOD OF USING THE SAME

(75) Inventors: Won-seok Chung, Suwon-si (KR); Myo-yong Lee, Suwon-si (KR); Kak Namkoong, Seoul (KR); Woochang Lee, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 233 days.

(21) Appl. No.: 13/007,750

(22) Filed: Jan. 17, 2011

(65) Prior Publication Data

US 2011/0190147 A1 Aug. 4, 2011

(30) Foreign Application Priority Data

Feb. 3, 2010 (KR) ........................ 10-2010-0010133

(51) Int. Cl.

| | |
|---|---|
| ***B01L 3/00*** | (2006.01) |
| ***B01L 99/00*** | (2010.01) |
| ***F16K 3/00*** | (2006.01) |
| ***C40B 40/00*** | (2006.01) |
| ***C40B 60/00*** | (2006.01) |
| ***F16K 31/00*** | (2006.01) |

(52) U.S. Cl.

USPC ............... 422/503; 506/13; 506/33; 422/538; 251/354

(58) Field of Classification Search

USPC .................................................. 422/503, 542

See application file for complete search history.

(56) References Cited

U.S. PATENT DOCUMENTS 6,733,977 B2 5/2004 Besemer et al.
7,358,078 B2 4/2008 Chen et al.
7,396,677 B2 7/2008 Patno et al.
2004/0219661 A1 11/2004 Chen et al.
2005/0042768 A1* 2/2005 Fredrick ........................ 436/174
2006/0154360 A1 7/2006 Lee et al.
2007/0154355 A1* 7/2007 Berndt et al. ................. 422/100
2007/0297947 A1 12/2007 Sommers et al.

OTHER PUBLICATIONS

Hwang et al., "Rapid Detection of Bacterial Cell from Whole Blood: Integration of DNA Sample Preparation into Single Micro-PCR Chip", Solid-State Sensors, Actuators and Microsystems Conference, 2009; Transducers 2009, pp. 57-60, Jun. 21-25, 2009.*

*DOE Fundamentals Handbook, Engineering Symbology, Prints, and Drawings, Module 2: Engineering Fluid Diagrams and Prints*, DOE-HDBK-1016/1-93, Jan. 1993, pp. 3, 16.

* cited by examiner

*Primary Examiner* — Jill Warden
*Assistant Examiner* — Brittany Fisher
(74) *Attorney, Agent, or Firm* — Leydig, Voit & Mayer, Ltd.

(57) ABSTRACT

A microarray reaction device includes a fluid container, a reaction chamber, a first channel connected with the fluid container, a second channel connected with the reaction chamber, and a valve. The valve includes a first and second support unit, respectively including a first and second penetration opening unit, extended through a first and second surface thereof. The first and second penetration opening unit is connected to a second end of the first and second channel, respectively. The second support unit includes a third penetration opening unit extended through a second surface thereof. The first and second surfaces contact each other, such that the first support unit and the second support unit are slidably disposed with each other. The microarray reaction device further includes a storing chamber connected with the third penetration opening unit, and a pump connected to the storing chamber and providing pressure to the storing chamber.

18 Claims, 12 Drawing Sheets

MICROARRAY REACTION DEVICE AND METHOD OF USING THE SAME

CROSS-REFERENCE TO RELATED APPLICATIONS

This application claims priority to Korean Patent Application No. 10-2010-0010133, filed on Feb. 3, 2010, and all the benefits accruing therefrom under 35 U.S.C. §119, the disclosure of which is incorporated herein in its entirety by reference.

BACKGROUND

1. Field

Provided are microarray reaction devices and methods of using the same.

2. Description of the Related Art

Detecting or analyzing target biomaterials or biomolecules by using a microarray is used in various fields, for example, in functional analysis and research on human genes, genetic analysis of diseases including cancer, and pharmacogenomics. A microarray is a device having a large number of probes which may combine with target biomaterials or biomolecules, and has good characteristics in detecting and analyzing target biomaterials or biomolecules. In order to obtain desired information from a microarray, target biomaterials or biomolecules are efficiently reacted to and combined with the probes in the microarray.

Accordingly, a device for performing microarray reaction in an automated and efficient manner has been proposed. In an embodiment, for example, the microarray reaction device may successively perform some processes, such as combining target biomaterials or biomolecules with probes in the microarray, labeling the target biomaterials or biomolecules for detection, and washing the microarray after the labeling. Automated reaction processes improve the performance of the microarray and user convenience. Also, a small amount of reaction reagent may be used so as to reduce costs in such automated processes because it is possible to handle a tiny volume of liquid with precise controllers. Accordingly, studies on efficiently performing detection or analysis of target biomaterials or biomolecules by using an automated microarray reaction device are being conducted.

SUMMARY

Provided are microarray reaction devices having excellent characteristics in microarray reaction and methods of using the devices.

Additional aspects will be set forth in part in the description which follows and, in part, will be apparent from the description, or may be learned by practice of the illustrated embodiments.

Provided is a microarray reaction device including a fluid container, a reaction chamber including a unit for positioning microarray, a first channel having one end connected with the fluid container, a second channel having one end connected with the reaction chamber, and a valve including a first support unit and a second support unit. A first penetration opening unit connected to the other end of the first channel and a second penetration opening unit connected to the other end of the second channel are extended through a first surface of the first support unit. The second support unit has a third penetration opening unit extended through a second surface connected with the first surface, and a position of the first support unit or the second support unit may be changed by sliding motion. The microarray reaction device further includes a storing chamber connected with the third penetration opening unit, and a pump that provides a positive or negative pressure to the storing chamber.

An embodiment of a microarray is a device having numerous probes, which can combine with a target material, on a substrate. The target material includes all biomaterials to be detected. Examples of the biomaterials include nucleic acid, peptide, protein, sugar, virus, cell, and organelle, but are not limited thereto. The biomaterial includes a material that is derived from an organism or that is synthesized or semi-synthesized with the organism. The probe may include at least one biomaterial monomer. Examples of the biomaterial may include deoxyribonucleic acid ("DNA"), ribonucleic acid ("RNA"), nucleotide, nucleoside, protein, polypeptide, peptide, amino acid, carbohydrate, enzyme, antibody, antigen, receptor, virus, stroma, ligand, membrane, and a combination thereof, but are not limited thereto. The substrate may include a material to which the probe is able to be fixed, for example, quartz, silicon, glass, a metal, plastic, or ceramic. When the substrate includes silicon, an oxide layer, such as a silicon dioxide ($SiO_2$) layer, may be coated on the substrate. A surface of the substrate may be coated with a variety of materials so that the probes are fixed on the oxide layer. In embodiments, for example, the variety of materials for coating the substrate may include a material selected from the group consisting of various types of linker, an amine group, a carboxyl group, an epoxy group, a sulfur group, an aldehyde group, activated ester, and maleimide. The substrate may have a flat, bead, or spherical shape, but is not limited thereto.

In an embodiment, the microarray reaction includes various reactions, such as bio or biochemical reactions, for detecting or analyzing a target material by using the microarray. In embodiments, for example, a sample including target nucleic acids labeled with a detectable molecule, such as a fluorescent material, is reacted with the microarray, and nucleic acid probes having a complementary sequence to the target nucleic acids are fixed on a substrate, to join two complementary strands of nucleic acids. After the nucleic acid probe and the target nucleic acid are hybridized, the microarray may be cleaned to remove a material that is not reacted, and an excitation light may be irradiated on the fluorescent material of the hybridized nucleic acids so that the emitting light in response to the excitation light may be detected by a microarray scanning system.

In an embodiment, the microarray reaction device performs the microarray reaction and includes devices for detecting and analyzing results of the microarray reaction. The microarray reaction device includes a reaction chamber where the microarray reaction occurs, a fluid container including or temporarily storing fluid (liquid or gas) required in the microarray reaction, and a channel connected with the reaction chamber and the fluid container. The reaction chamber includes a unit for positioning microarray in which a microarray is installed. Also, the microarray reaction device may further include a valve for controlling fluid flowing between the reaction chamber, the fluid container, and the channel. In addition, the microarray reaction device may further include a pump for providing a driving force for fluid flowing. Accordingly, the microarray reaction device may perform combining the target material to the probe for the microarray reaction, labeling the target material or the probe combined to the target material, washing the microarray surface after the combining and/or labeling, or drying the microarray surface.

In an embodiment, the microarray reaction device includes the fluid container. The fluid container may contain a liquid or gas. In an embodiment, for example, the fluid container contains, but is not limited to, water, distilled water, a buffer, a washing solution, a dye solution, or nitrogen gas for cooling and drying. Also, the fluid container may be empty. The empty fluid container may be used for storing fluid to be wasted after the microarray reaction or storing used washing solution. In addition, the fluid container may further include an outflow unit for discharging a waste fluid and/or a washing solution outside of the microarray reaction device.

In an embodiment, the microarray reaction device includes the reaction chamber including the unit for positioning the microarray. The microarray may be installed in the unit for positioning microarray. Also, the reaction chamber includes a space for the microarray reaction. In an embodiment, for example, at least one liquid or gas may cause physical, chemical, biological, or biochemical reactions for detecting and/or measuring the microarray reaction in the microarray and the space. In addition, the reaction chamber may further include a sample inlet unit for inflow and outflow of a sample solution, a cover for covering the reaction chamber and a lock for locking the cover, and a heater, a cooler, or both for controlling a temperature of the reaction chamber, and a temperature controller for controlling the heater, the cooler, or both.

In an embodiment, the microarray reaction device includes a first channel having one end connected with the fluid container. Also, the microarray reaction device includes a second channel having one end connected with the reaction chamber. The channels include all structures that allow flowing of liquid or gas. The first channel is connected with the fluid container and the second channel is connected with the reaction chamber. The one end of the first channel is connected to the fluid container and the other end of the first channel is connected with a first penetration opening unit of the valve. The one end of the second channel is connected to the reaction chamber and the other end of the second channel is connected with a second penetration opening unit of the valve.

Also, the number of the first channel may be two or more. The two or more first channels may be connected to two or more fluid containers, and two or more first penetration opening units of the valve, respectively. The number of the second channel may be two or more. The two or more second channels may be connected to two or more reaction chambers, and two or more second penetration opening units of the valve, respectively. In addition, the second channel may further include a fluid sensor for controlling an amount of fluid passing through the second channel. The fluid sensor measures and controls an amount and location of fluid passing through the second channel. In this regard, the fluid sensor may be positioned in or out of the second channel.

In an embodiment, the microarray reaction device includes the valve. The valve includes a first support unit and a second support unit. The first penetration opening unit, which is connected to the one end of the first channel, and the second penetration opening unit, which is connected to the one end of the second channel, are extended through a first surface of the first support unit. The second support unit has a third penetration opening unit extended through a second surface of the second support unit and connected (e.g., directly contacting) to the first surface. Position of the first support unit or the second support unit may be changed by sliding motion.

In an embodiment, the first support unit includes the first penetration opening unit connected with the first channel that is connected with the fluid container, and the second penetration opening unit connected with the second channel that is connected with the reaction chamber. The first support unit includes the first surface through which the first penetration opening unit and the second penetration opening unit are exposed. The second support unit includes the third penetration opening unit that is exposed through the second surface connected with the first surface and is connected with the storing chamber. Also, relative positions of the first support unit or the second support unit may be changed by sliding motion. The first surface and the second surface are in contact with each other so that fluid does not leak therebetween.

The first support unit or the second support unit may respectively move along the first surface or the second surface. The third penetration opening unit extended through the second surface of the second support unit, is connected with the first penetration opening unit or the second penetration opening unit extended through the first surface of the first support unit, by a sliding motion of the first support unit or the second support unit. Accordingly, the first penetration opening unit and the third penetration opening unit are connected to each other so that the valve connects the fluid container with the storing chamber by a sliding motion of the first support unit or the second support unit, and blocks fluid from moving between the reaction chamber and the storing chamber. Also, the second penetration opening unit and the third penetration opening unit are connected to each other so that the valve connects the reaction chamber with the storing chamber, and blocks fluid from moving between the fluid container and the storing chamber.

In an embodiment, the first support unit may be a ring shape, whose outer surface is connected to the first channel and the second channel, and the first penetration opening unit and the second penetration opening unit are extended through the inner surface of the first support unit. In this case, the inner surface is the same as the first surface. The second support unit may be a cylindrical shape and may rotate in a clockwise or counterclockwise direction. In this case, a part of the outer surface of the second support unit which is a cylindrical shape is the same as the second surface. In an embodiment, for example, if the first surface of the first support unit is the inner surface of the first support unit which is a ring shape, the second surface connected to the first surface of the first support unit may be a part of the outer surface of a cylinder, that is, the second support unit.

The first support unit or the second support unit moves by sliding motion along the inner surface of the first support unit or along the outer surface of the second support unit. The first penetration opening unit and the third penetration opening unit are connected to each other so that the valve connects the fluid container with the storing chamber by the sliding motion, and blocks fluid from moving between the reaction chamber and the storing chamber. Also, the second penetration opening unit and the third penetration opening unit are connected to each other so that the valve connects the reaction chamber with the storing chamber, and blocks fluid from moving between the fluid container and the storing chamber. In this case, the third penetration opening unit is in the second support unit so that a direction of flow passing through one end of the third penetration opening unit is perpendicular to a direction of flow passing through the other end of the third penetration opening unit.

In an embodiment, the microarray reaction device includes the storing chamber connected with the third penetration opening unit. The storing chamber may store fluid flowing from the fluid container or the reaction chamber through the third penetration opening unit of the valve. The storing chamber may be connected to the third penetration opening unit through a channel or may be directly connected thereto.

In an embodiment, the microarray reaction device includes the pump which provides positive or negative pressure to the storing chamber. Driving force for fluid flowing may be provided to the microarray reaction device by positive or negative pressure generated from the pump. In an embodiment, for example, in a case of transferring fluid in the fluid container to the reaction chamber, the first channel and the third penetration opening unit are connected to each other by controlling the valve. When negative pressure is provided to the storing chamber by the pump, fluid in the fluid container may be moved to the storing chamber. In a case of transferring fluid in the storing chamber to the reaction chamber, the second channel and the third penetration opening unit are connected to each other by controlling the valve. When positive pressure is provided to the storing chamber by the pump, fluid in the storing chamber may be moved to the reaction chamber. The pump may be a syringe pump.

In an embodiment, the microarray reaction device may include two or more fluid containers, two or more first channels, and two or more first penetration opening units. Each of the first penetration opening units may be connected with one fluid container through one first channel. The microarray reaction device may include two or more reaction chambers, two or more second channels, and two or more second penetration opening units. Each of the second penetration opening units may be connected with one reaction chamber through one second channel. Each of the fluid containers may contain a liquid or gas for the microarray reaction. In an embodiment, for example, the two or more fluid containers may contain, but are not limited to, water, distilled water, a buffer, a washing solution, a dye solution, or nitrogen gas for cooling and drying.

In an embodiment, each of the fluid containers may be connected with the two or more first penetration opening units through the two or more first channels. In addition, each of the reaction chambers may include microarrays that are the same as or different from each other. The microarray reaction device may perform at least one microarray reaction. Each of the reaction chambers may be connected with the two or more second penetration opening unit through the two or more second channels.

In an embodiment, the microarray reaction device includes a signal control module for controlling a flow of fluid therein or for providing an appropriate environment for the microarray reaction. The signal control module may be equipped within the microarray reaction device or connected to the microarray reaction device. Accordingly, the signal control module may control sliding motion of the first support unit or the second support unit, positive or negative pressure generated from the pump, the fluid sensor, opening or closing of the sample inlet unit for inflow and outflow of a sample solution, opening or closing the cover of the reaction chamber and the heater, the cooler or both for controlling temperature of the reaction chamber.

Provided is an analysis method using a microarray including providing the microarray reaction device, introducing fluid for a microarray reaction to a first fluid container and installing a microarray in a unit for positioning microarray of a first reaction chamber, moving a first support unit or a second support unit by sliding motion and connecting a third penetration opening unit to a first penetration opening unit on the first support unit, driving a pump to provide negative pressure to a storing chamber and transferring fluid in the first fluid container to a storing chamber, moving the first support unit or the second support unit by sliding motion and connecting the third penetration opening unit to a second penetration opening unit on the first support unit, driving the pump to provide positive pressure to the storing chamber and transferring fluid in the storing chamber to a first reaction chamber.

In an embodiment, the method includes the providing of the microarray reaction device. The microarray reaction device is described above.

In an embodiment, the method includes introducing fluid for the microarray reaction to the first fluid container and installing the microarray in the unit for positioning microarray of the first reaction chamber. The first fluid container, the microarray reaction, the fluid for the microarray reaction, the first reaction chamber, and the unit for positioning microarray included in the first reaction chamber are described above. The number of the first fluid container may be two or more. Each of the fluid containers may contain various fluids for the microarray reaction. Also, the number of the first reaction chamber may be two or more. Each of the first reaction chambers may include two or more microarrays that are the same as or different from each other.

In an embodiment, the method may include connecting the third penetration opening unit with the first penetration opening unit on the first support unit by sliding the first support unit or the second support unit. In this case, the first fluid container is connected with the storing chamber.

In an embodiment, the method includes transferring the fluid in the first fluid container to the storing chamber by driving the pump to provide negative pressure to the storing chamber. In this case, the fluid in the first fluid container may move to the storing chamber.

In an embodiment, the method includes connecting the third penetration opening unit with the second penetration opening unit on the first support unit by sliding the first support unit or the second support unit. In this case, the reaction chamber is connected with the storing chamber.

In an embodiment, the method includes transferring the fluid in the storing chamber to the first reaction chamber by driving the pump to provide positive pressure to the storing chamber. In this case, the fluid in the storing chamber may move to the reaction chamber. Accordingly, the fluid which moved to the reaction chamber may perform the microarray reaction in the reaction chamber.

In an embodiment, the method includes retransferring the fluid in the first reaction chamber to the storing chamber by driving the pump to provide negative pressure to the storing chamber. In this case, the fluid in the first reaction chamber may move again to the storing chamber. Accordingly, the fluid used to perform the microarray reaction in the reaction chamber may be removed from the reaction chamber.

In an embodiment of the method, the microarray reaction device includes two or more fluid containers. The method includes connecting one end of a third channel to the first penetration opening unit on the first support unit by sliding the first support unit or the second support unit, and transferring the fluid, which is retransferred to the storing chamber, to a second fluid container by driving the pump to provide positive pressure to the storing chamber. In this case, the fluid in the storing chamber may move to the second fluid container. The second fluid container may be a waste chamber and the waste chamber may store fluid to be discharged after being used for the microarray reaction in the reaction chamber. Also, the second fluid container may be connected to an outlet for discharging gas used in the microarray reaction. Accordingly, the microarray reaction device may control flow of fluid in both directions between at least one fluid container and the reaction chamber by only one valve, only one storing chamber, and only one pump.

In an embodiment, the method may include pushing and pulling fluid in the reaction chamber by driving the pump to provide positive and/or negative pressure to the storing chamber. In this case, the second channel may further include the fluid sensor for controlling an amount of fluid passing through the second channel. In this case, the fluid may be agitated by inflow and/or outflow of the fluid in the reaction chamber. Here, the amount of inflow and/or outflow of the fluid is controlled by the amount of positive or negative pressure provided by the pump. Also, the fluid sensor may monitor an amount of the inflow and/or outflow of the fluid by monitoring location of the fluid. In addition, the fluid flowing from the reaction chamber may reach the second channel, the second penetration opening unit, or the storing chamber. Pushing and/or pulling of the fluid in the reaction chamber may be repeated.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
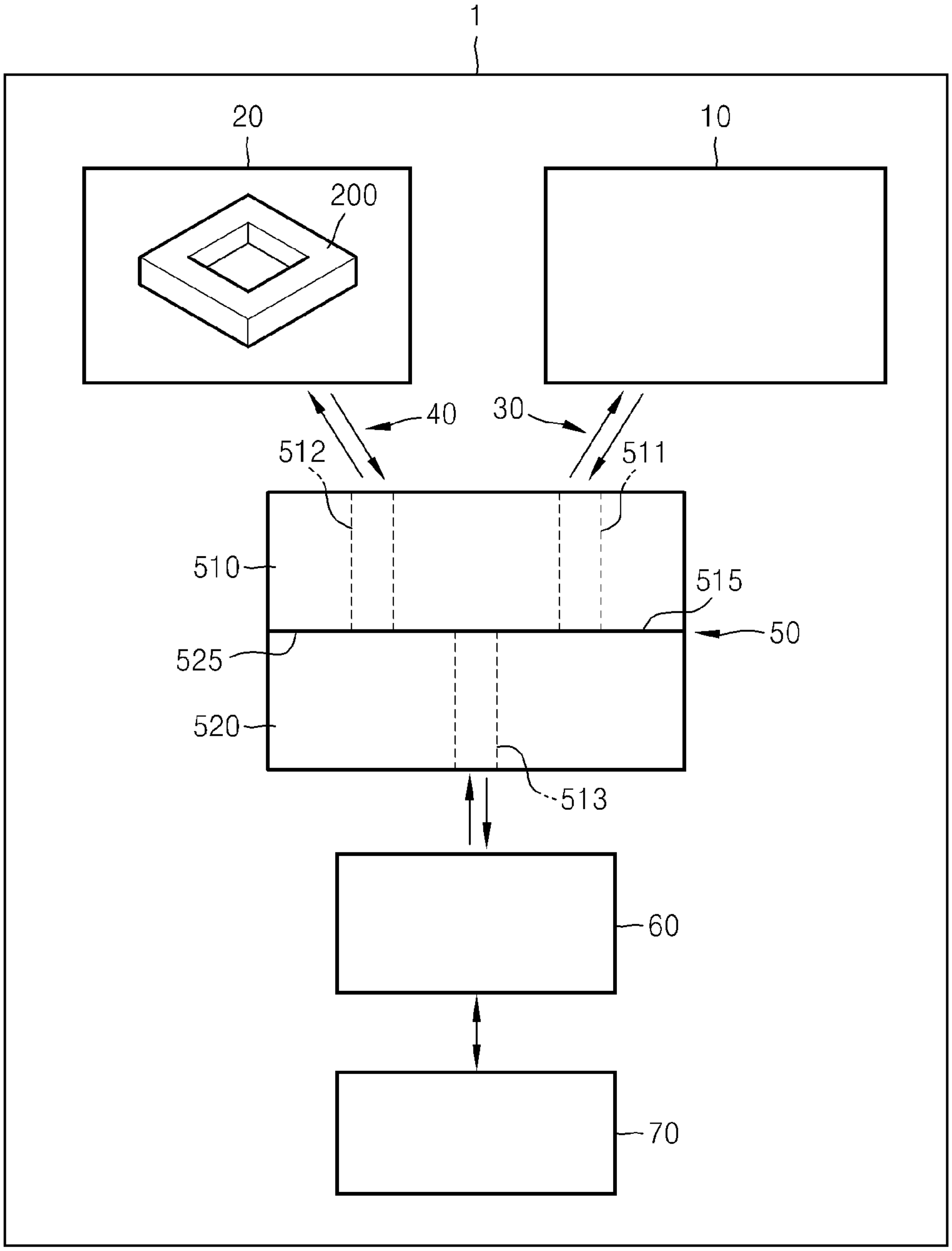
FIG. 1 is a block diagram of an embodiment of a microarray reaction device, according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically, fluidly and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, one or more embodiments of the present invention will be described more fully with reference to the accompanying drawings.

FIG. 1 is a block diagram of an embodiment of a microarray reaction device 1, according to the present invention.

The microarray reaction device 1 includes a fluid container 10, a reaction chamber 20 including a unit for positioning microarray 200, a first channel 30 having a first end physically and/or fluidly connected with the fluid container 10, a second channel 40 having a first end physically and/or fluidly connected with the reaction chamber 20, and a valve 50.

The valve 50 includes a first support unit 510 and a second support unit 520. The valve 50 further includes a first penetration opening unit 511 physically and/or fluidly connected to a second end opposing the first end of the first channel 30, and a second penetration opening unit 512 physically and/or fluidly connected to a second end opposing the first end of the second channel 40. The first penetration opening unit 511 and the second penetration opening unit 512 are extended through a first surface 515 of the first support unit 510. The first penetration opening unit 511 and the second penetration opening unit 512 extend completely through a thickness of the first support unit 510, such that an inner portion of the first penetration opening unit 511 and the second penetration opening unit 512 are exposed to an outside of the first support unit 510 at both the first surface 515 and a surface opposing the first surface 515. The first penetration opening unit 511 and the second penetration opening unit 512 may be considered an enclosed opening penetrating the thickness of the first support 510, such that the first support 510 solely defines the enclosed first penetration opening unit 511 and second penetration opening unit 512.

The second support unit 520 has a third penetration opening unit 513 extended through a second surface 525 of the second support unit 520 and connected to (e.g., directly contacting) the first surface 515. A position of the first support unit 510 or the second support unit 520 with respect to the other unit, may be changed by sliding motion. The third penetration opening unit 513 extends completely thorough a thickness of the second support unit 520, such that an inner portion of the third penetration opening unit 513 is exposed to an outside of the second support unit 520 at the second surface 525 and a surface opposing the second surface 525. The third penetration opening unit 513 may be considered an enclosed opening penetrating the thickness of the second support 520, such that the second support 520 solely defines the enclosed third penetration opening unit 513.

The microarray reaction device 1 further includes a storing chamber 60 physically and/or fluidly connected with the third penetration opening unit 513 of the second support unit 520, and a pump 70 providing positive or negative pressure to the storing chamber 60.

The fluid container 10 may contain a liquid or gas (not illustrated) for a microarray reaction. In one embodiment, for example, the fluid container 10 may contain, but is not limited to, water, distilled water, a buffer, a washing solution, a dye solution, or nitrogen gas for cooling and drying. Also, the fluid container 10 may be empty. In addition, the fluid container 10 may include an outflow unit (not illustrated) for discharging a waste fluid and/or a washing solution outside of the microarray reaction device.

The reaction chamber 20 includes the unit for positioning microarray 200 in which a microarray is installed. Also, the reaction chamber 20 includes a space (not illustrated) for the microarray reaction. In addition, the reaction chamber 20 may further include a sample inlet unit (not illustrated) for inflow and outflow of a sample solution, a cover (not illustrated) for covering the reaction chamber 20 and a lock (not illustrated) for locking the cover, and a heater, a cooler, or both (not illustrated) for controlling a temperature of the reaction chamber 20.

The microarray reaction device 1 includes the first channel 30 having the first end connected with the fluid container 10, and the second channel 40 having the first end connected with the reaction chamber 20. The first end of the first channel 30 is connected to the fluid container 10, and the second end of the first channel 30 is connected to the first penetration opening unit 511 of the valve 50. The first end of the second channel 40 is connected to the reaction chamber 20, and the second end of the second channel 40 is connected to the second penetration opening unit 512 of the valve 50.

The valve 50 includes the first support unit 510 and the second support unit 520. The first support unit 510 includes the first surface 515 through which the first penetration opening unit 511 and the second penetration opening unit 512 are extended. The first penetration opening unit 511 is connected to the second end of the first channel 30, and the second penetration opening unit 512 is connected to the second end of the second channel 40. The second support unit 520 includes the third penetration opening unit 513 extended through the second surface 525 connected to (e.g., directly contacting) the first surface 515. Position of the first support unit 510 or the second support unit 520 may be changed, such as by sliding motion. The first surface 515 and the second surface 525 are in contact with each other so that fluid does not leak therebetween. The first support unit 510 or the second support unit 520 may respectively move along the first surface 515 or the second surface 525. That is, the first support unit 510 may be moveable in a direction parallel to the first surface 515 and relative to the second support unit 520. Similarly, the second support unit 520 may be moveable in a direction parallel to the second surface 525 and relative to the first support unit 510.

The storing chamber 60 is connected with the third penetration opening unit 513. The storing chamber 60 may store fluid flowing from the fluid container 10 and/or the reaction chamber 20, and through the third penetration opening unit 513 of the valve 50. The storing chamber 60 may be connected to the third penetration opening unit 513 through an intermediate channel or may be directly connected to the third penetration opening unit 513.

The pump 70 provides positive or negative pressure to the storing chamber 60 so that a driving force for fluid flowing may be provided to the microarray reaction device 1. In one embodiment, for example, in a case of transferring fluid in the fluid container 10 to the reaction chamber 20, the first channel 30 and the third penetration opening unit 513 are openly connected to each other by controlling the valve 50. When negative pressure is provided to the storing chamber 60 by the pump 70, fluid in the fluid container 10 may be moved to the storing chamber 60. In a case of transferring fluid in the storing chamber 60 to the reaction chamber 20, the second channel 40 and the third penetration opening unit 513 are openly connected to each other by controlling the valve 50. When positive pressure is provided to the storing chamber 60 by the pump 70, fluid in the storing chamber 60 may be moved to the reaction chamber 20. In an embodiment, the pump 70 may be a syringe pump.

Figure 2A:
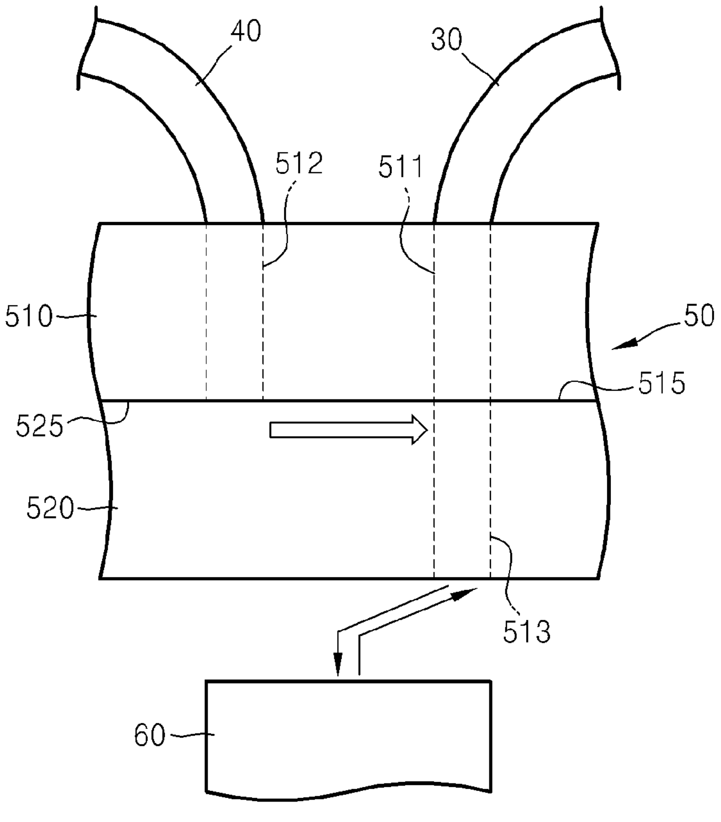
FIGS. 2A through 2B illustrate embodiments of a valve included in the microarray reaction device and a method of driving the valve, according to the present invention.
Figure 2B:
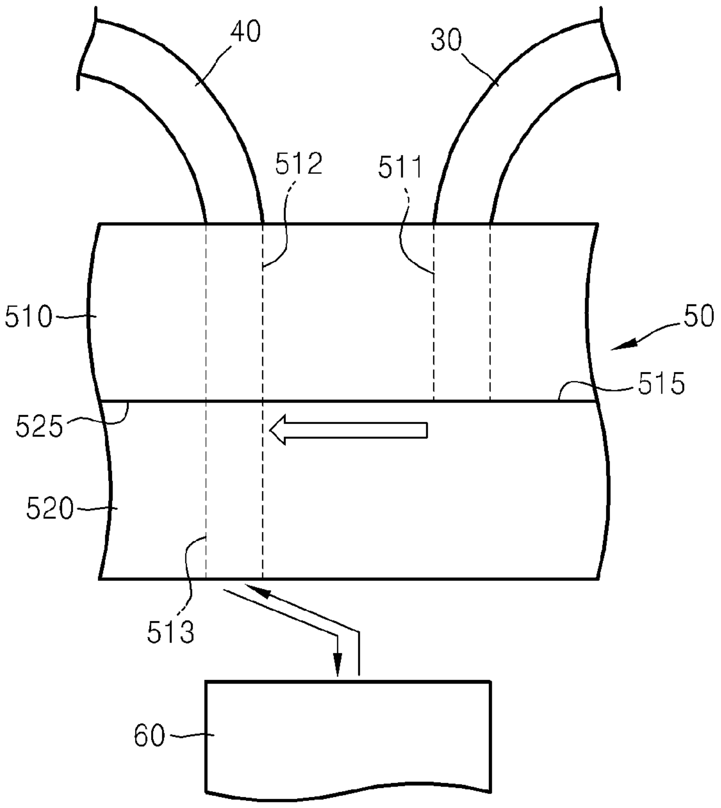

FIGS. 2A through 2B illustrate embodiments of the valve 50 included in the microarray reaction device 1, and a method of driving the valve 50, according to the present invention.

The valve 50 includes the first support unit 510 and the second support unit 520. The first support unit 510 and the second support unit 520 are slidably disposed with respect to each other.

In FIG. 2A, the first channel 30 and the storing chamber 60 are fluidly connected by a sliding motion (see arrow) of the second support unit 520.

The third penetration opening unit 513 extended through the second surface 525 of the second support unit 520 is connected with the first penetration opening unit 511 extended through the first surface 515 of the first support unit 510 by a sliding motion (see arrow) of the second support unit 520. Accordingly, the first penetration opening unit 511 and the third penetration opening unit 513 are aligned and connected to each other so that the first penetration opening unit 511 connects the fluid container 10 (not illustrated) with the storing chamber 60 through the first channel 30, and blocks fluid from moving between the reaction chamber 20 (not illustrated) and the storing chamber 60 through the second channel 40.

In FIG. 2B, the second channel 40 and storing chamber 60 are fluidly connected by a sliding motion (see arrow) of the second support unit 520.

The third penetration opening unit 513 extended through the second surface 525 of the second support unit 520 is connected with the second penetration opening unit 512 extended through the first surface 515 of the first support unit 510 by a sliding motion (see arrow) of the second support unit 520. Accordingly, the second penetration opening unit 512 and the third penetration opening unit 513 are aligned and connected to each other so that the second penetration opening unit 512 connects the reaction chamber 20 (not illustrated) with the storing chamber 60 through the second channel 40, and blocks fluid from moving between the fluid container 10 (not illustrated) and the storing chamber 60 through the first channel 30.

Figure 3:
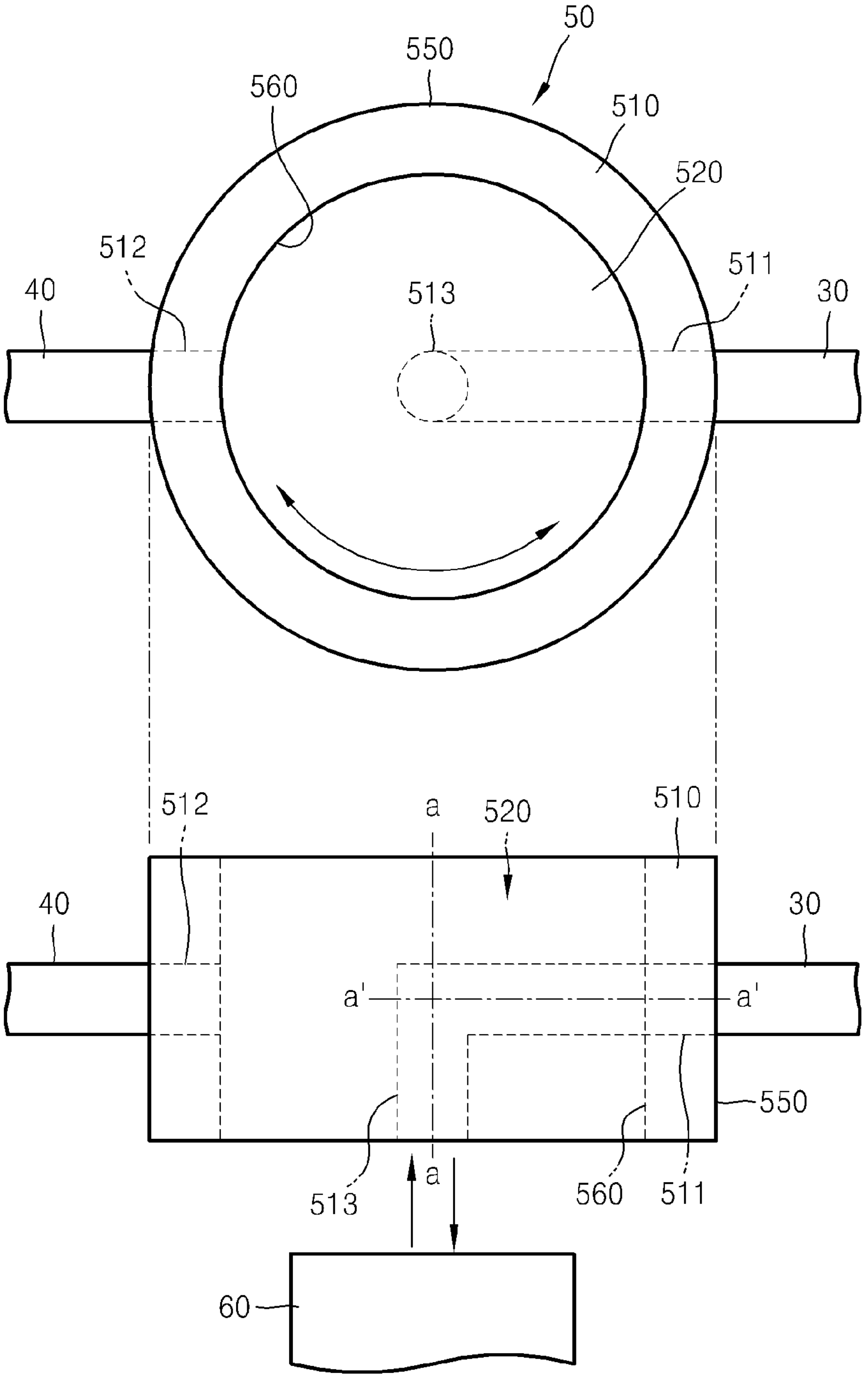
FIG. 3 illustrates another embodiment of a valve included in the microarray reaction device and a method of driving the valve, according to the present invention.

FIG. 3 illustrates another embodiment of the valve 50 included in the microarray reaction device 1, and a method of driving the valve 50, according to the present invention.

The valve 50 includes the first support unit 510 and the second support unit 520.

The first support unit 510 may be a ring shape, whose outer surface 550 is connected to the first channel 30 and the second channel 40. The first penetration opening unit 511 and the second penetration opening unit 512 are extended through an inner surface 560 of the first support unit 510. The second support unit 520 may be a cylindrical shape and may rotate in a clockwise or counterclockwise direction. In this case, the first support unit 510 or the second support unit 520 moves by sliding motion with respect to the other support unit, along the inner surface 560 of the first support unit 510 or the outer surface of the second support unit 520.

Due to the sliding motion of the second support unit 520, the first penetration opening unit 511 and the third penetration opening unit 513 are aligned and fluidly connected to each other so that the fluid container 10 (not illustrated) and the storing chamber 60 are connected to each other through the first channel 30, and fluid is blocked from moving between the reaction chamber 20 (not illustrated) and the storing chamber 60 through the second channel 40. Alternatively, the second penetration opening unit 512 and the third penetration opening unit 513 are aligned and fluidly connected to each other so that the reaction chamber 10 (not illustrated) and the storing chamber 60 are connected each other through the second channel 40, and fluid is blocked from moving between the fluid container 10 (not illustrated) and the storing chamber 60 through the first channel 30.

Referring to FIG. 3, the third penetration opening unit 513 is completely within the second support unit 520 so that a direction of flow (line a-a) passing through a first end of the third penetration opening unit 513 is substantially perpendicular to a direction of flow (line a'-a') passing through a second end of the third penetration opening unit 513 opposing the first end.

Figure 4:
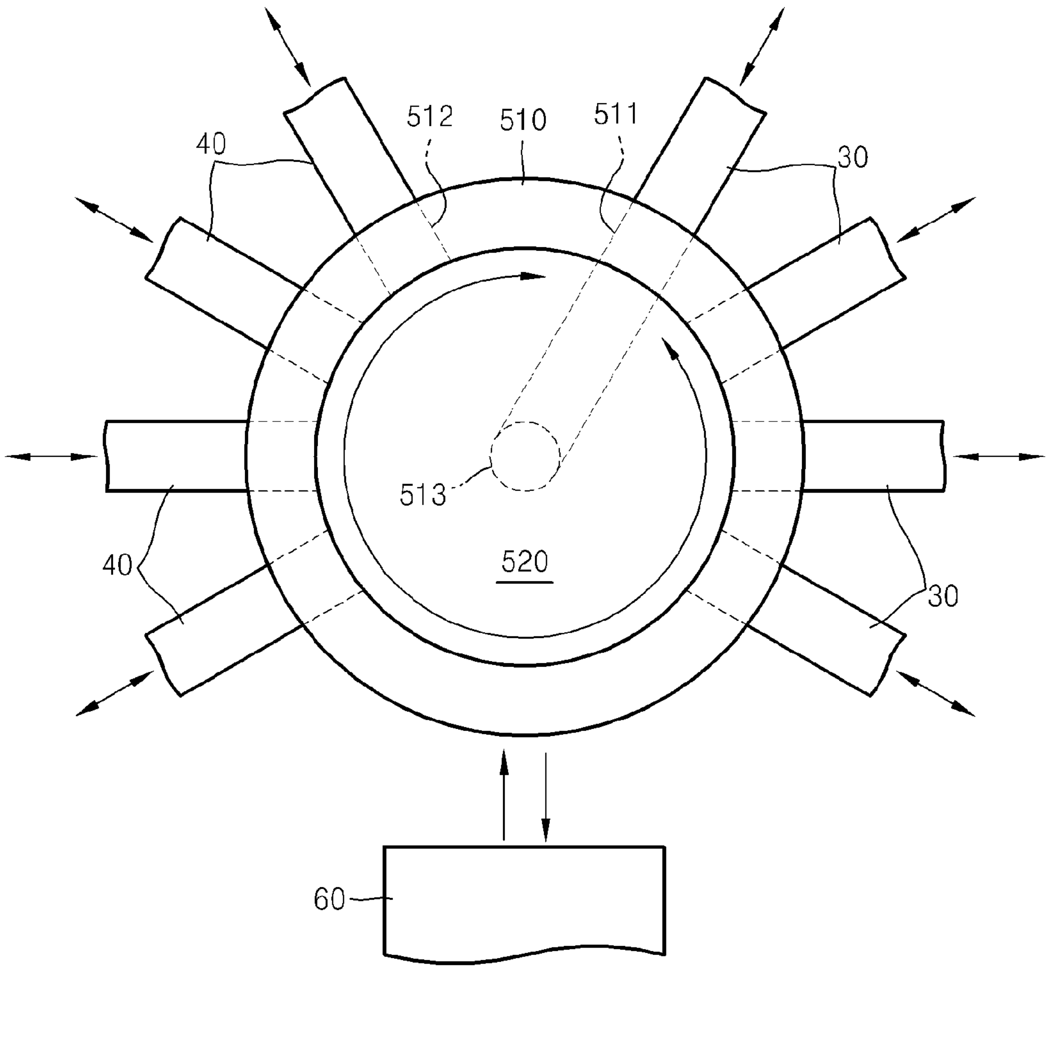
FIG. 4 illustrates another embodiment of a valve included in the microarray reaction device, according to the present invention.

FIG. 4 illustrates another embodiment of the valve 50 included in the microarray reaction device 1, according to the present invention.

The microarray reaction device 1 may include two or more of the fluid container 10 (not illustrated), two or more of the first channel 30, and two or more of the first penetration opening unit 511. Each of the first penetration opening units 511 may be connected with one fluid container 10 (not illustrated) through one first channel 30. The microarray reaction device 1 may include two or more of the reaction chamber 20 (not illustrated), two or more of the second channel 40, and two or more of the second penetration opening unit 512. Each of the second penetration opening units 512 may be connected with one reaction chamber 20 (not illustrated) through one second channel 40. Each of the fluid containers 10 (not illustrated) may contain a liquid or gas for the microarray reaction. In one embodiment, for example, the two or more fluid containers 10 (not illustrated) may contain, but are not limited to, water, distilled water, a buffer, a washing solution, a dye solution, or nitrogen gas for cooling and drying.

Alternatively, each of the fluid containers 10 (not illustrated) may be each connected with the two or more of the first penetration opening unit 511 through the two or more of the first channel 30. In addition, each of the reaction chambers 20 (not illustrated) may include microarrays (not illustrated) that are the same as or different from each other. The microarray reaction device 1 may perform at least one microarray reaction. Each of the reaction chambers 20 (not illustrated) may be connected with the two or more of the second penetration opening unit 512 through the two or more of the second channel 40.

Figure 5:
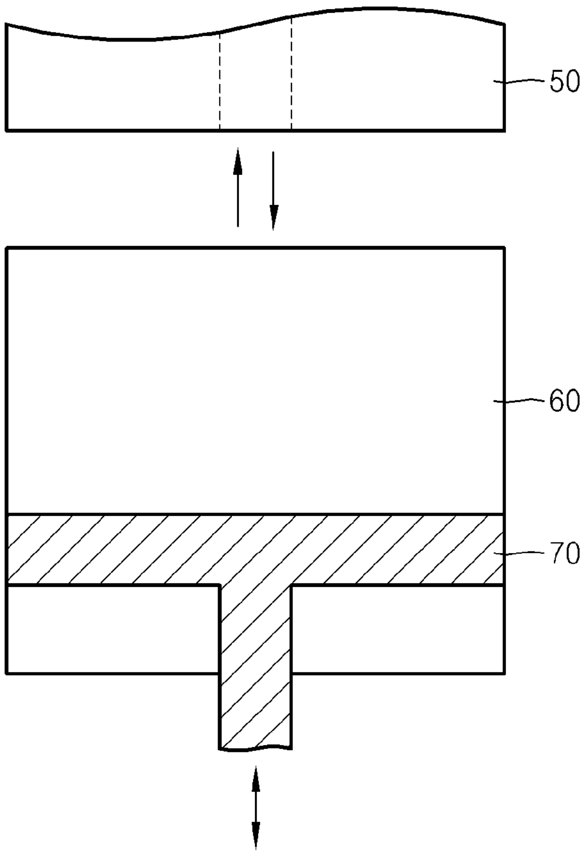
FIG. 5 illustrates an embodiment of a storing chamber and a pump included in the microarray reaction device, according to the present invention.

FIG. 5 illustrates an embodiment of the storing chamber 60 and a pump 70 included within the storing chamber 60 of the microarray reaction device 1, according to the present invention.

The storing chamber 60 is connected with the third penetration opening unit 513 of the valve 50. The storing chamber 60 may store fluid flowing from the fluid container 10 (not illustrated) or the reaction chamber 20 (not illustrated), through the third penetration opening unit 513 of the valve 50. The pump 70 provides positive or negative pressure to the storing chamber 60. Driving force for fluid flow may be provided in the microarray reaction device 1 by positive or negative pressure generated from the pump 70. Referring to FIG. 5, the pump 70 may be a syringe pump.

Figure 6:
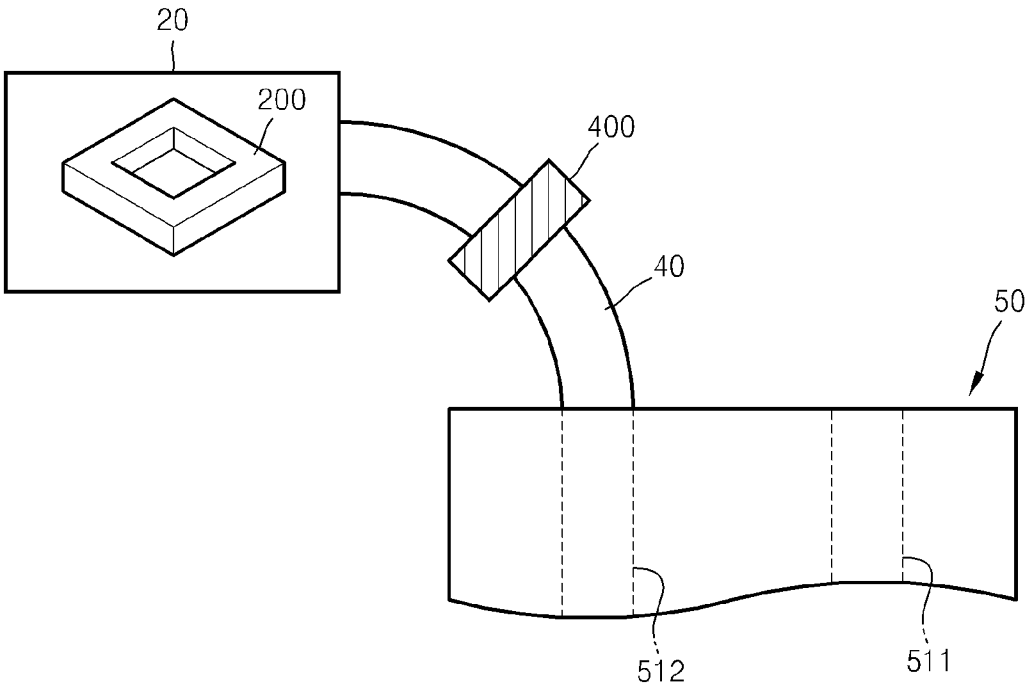
FIG. 6 illustrates an embodiment of a fluid sensor included in the microarray reaction device, according to the present invention.

FIG. 6 illustrates an embodiment of a fluid sensor 400 included in the microarray reaction device 1, according to the present invention. The second channel 40 connected to the second penetration opening unit 512 of the valve 50 further includes the fluid sensor 400 for controlling an amount of fluid passing through the second channel 40. The fluid sensor 400 measures and controls an amount and location of fluid passing through the second channel 40. In this regard, the fluid sensor 400 is positioned in or out of the second channel 40.

Figure 7A:
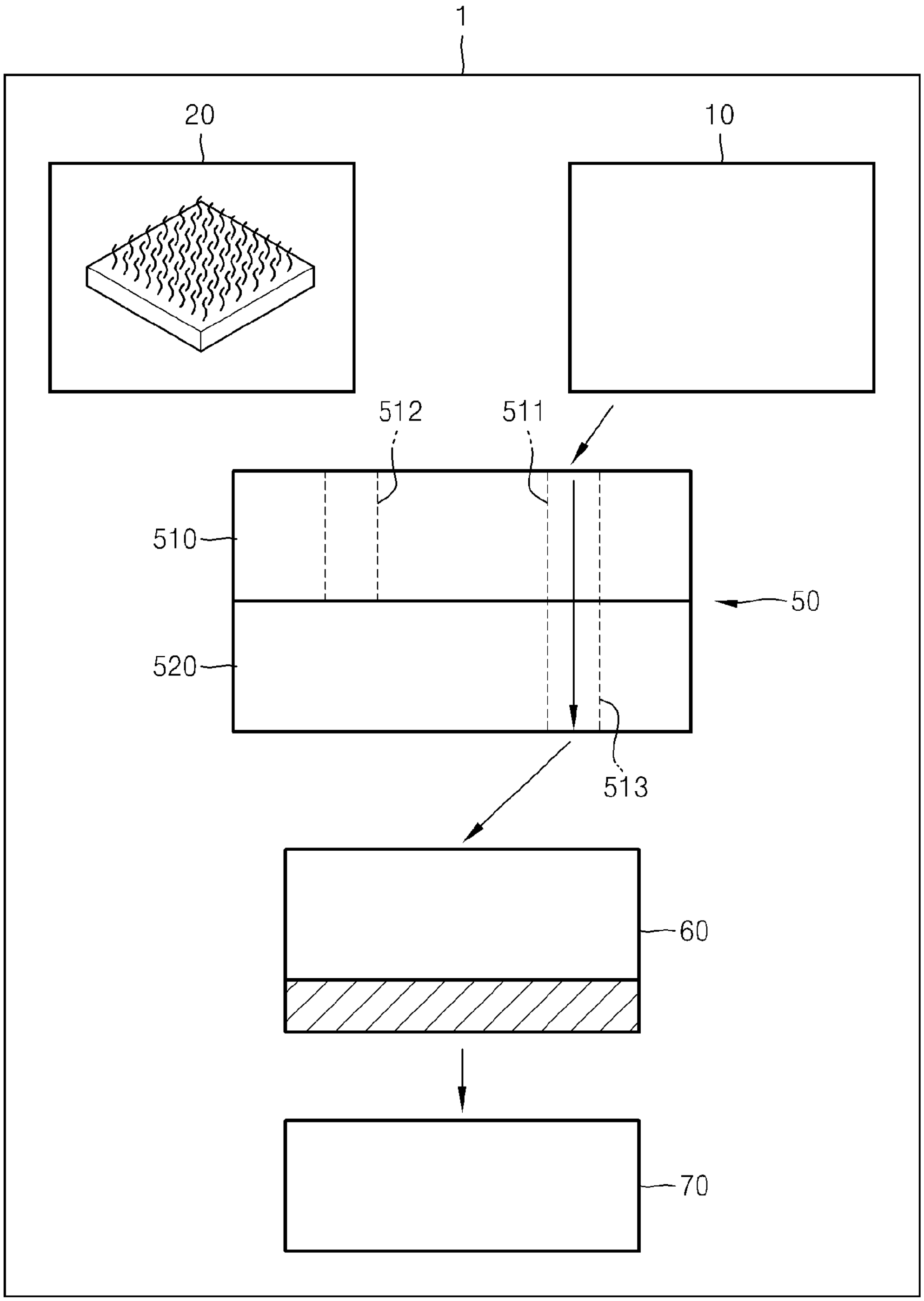
FIGS. 7A through 7B respectively illustrate an embodiment of a flow of fluid from a fluid container to a storing chamber, and from the storing chamber to a reaction chamber, in the microarray reaction device, according to the present invention.
Figure 7B:
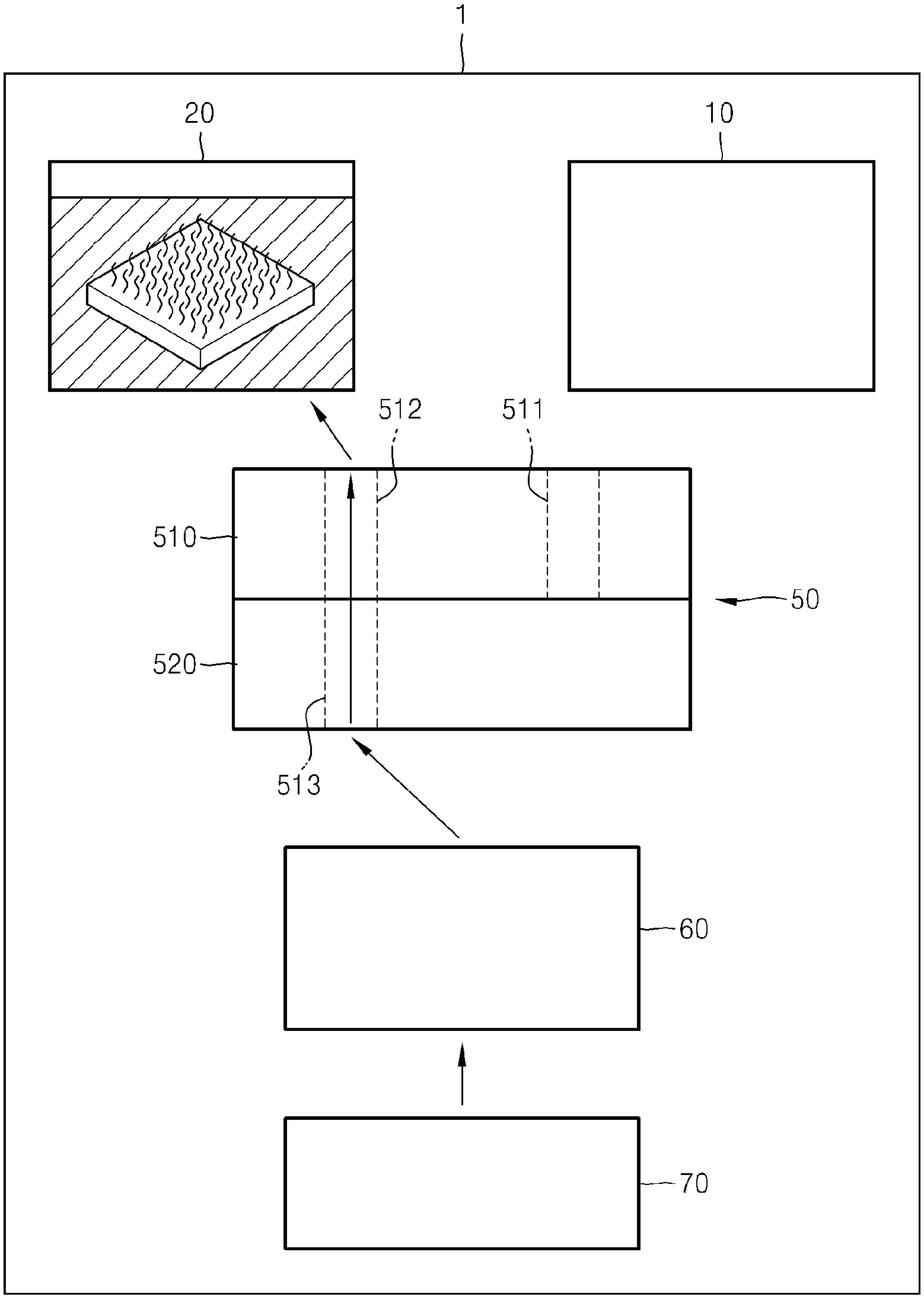

FIGS. 7A through 7B respectively illustrate an embodiment of a flow of fluid from the fluid container 10 to the storing chamber 60, and from the storing chamber 60 to the reaction chamber 20 in the microarray reaction device 1, according to the present invention.

The structure of the microarray reaction device 1 according to the illustrated embodiment of the present invention has been described above. When the microarray reaction device 1 is prepared, fluid for the microarray reaction is introduced in the fluid container 10. A microarray is installed in the unit for positioning microarray 200 (not illustrated) in the reaction chamber 20.

FIG. 7A illustrates flow of fluid from the fluid container 10 to the storing chamber 60. The first support unit 510 or the second support unit 520 is moved relative to the other unit, by sliding motion, and aligns and connects the third penetration opening unit 513 to the first penetration opening unit 511. When the pump 70 provides negative pressure (indicated by the down arrow between the storing chamber 60 and the pump 70) to the storing chamber 60, the fluid in the fluid container 10 is transferred to the storing chamber 60, as indicated by the remaining arrows and the hatched feature within the storing chamber 60.

FIG. 7B illustrates flow of fluid from the storing chamber 60 to the reaction chamber 20. The first support unit 510 or the second support unit 520 is moved relative to the other unit, by sliding motion, and aligns and connects the third penetration opening unit 513 to the second penetration opening unit 512.

When, the pump 70 provides positive pressure (indicated by the up arrow between the storing chamber 60 and the pump 70) to the storing chamber 60, the fluid in the storing chamber 60 is transmitted to the reaction chamber 20, as indicated by the remaining arrows and the hatched feature within the reaction chamber 20.

Figure 8:
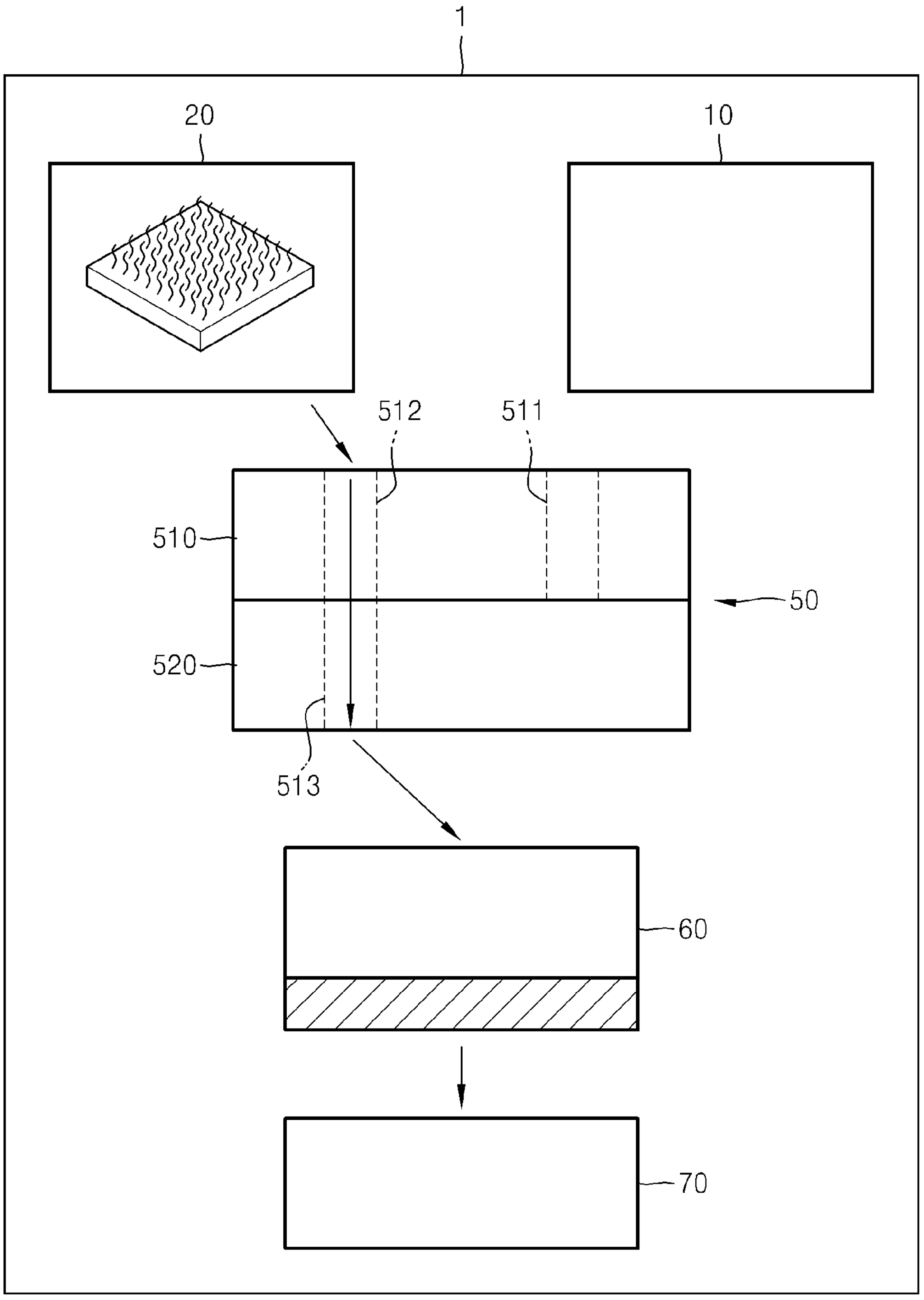
FIG. 8 illustrates an embodiment of a flow of fluid from a reaction chamber to a storing chamber in the microarray reaction device, according to the present invention.

FIG. 8 illustrates an embodiment of a flow of fluid from the reaction chamber 20 to the storing chamber 60 in the microarray reaction device 1, according to the present invention.

The first support unit 510 or the second support unit 520 is moved relative to the other unit, by sliding motion, and aligns and connects the third penetration opening unit 513 to the second penetration opening unit 512. When, the pump 70 provides negative pressure (indicated by the down arrow between the storing chamber 60 and the pump 70) to the storing chamber 60, the fluid in the reaction chamber 20 is transferred to the storing chamber 60 as indicated by the remaining arrows and the hatched feature within the storing chamber 60. Accordingly, the fluid for the microarray reaction in the reaction chamber 20 may be removed from the reaction chamber 20.

Figure 9:
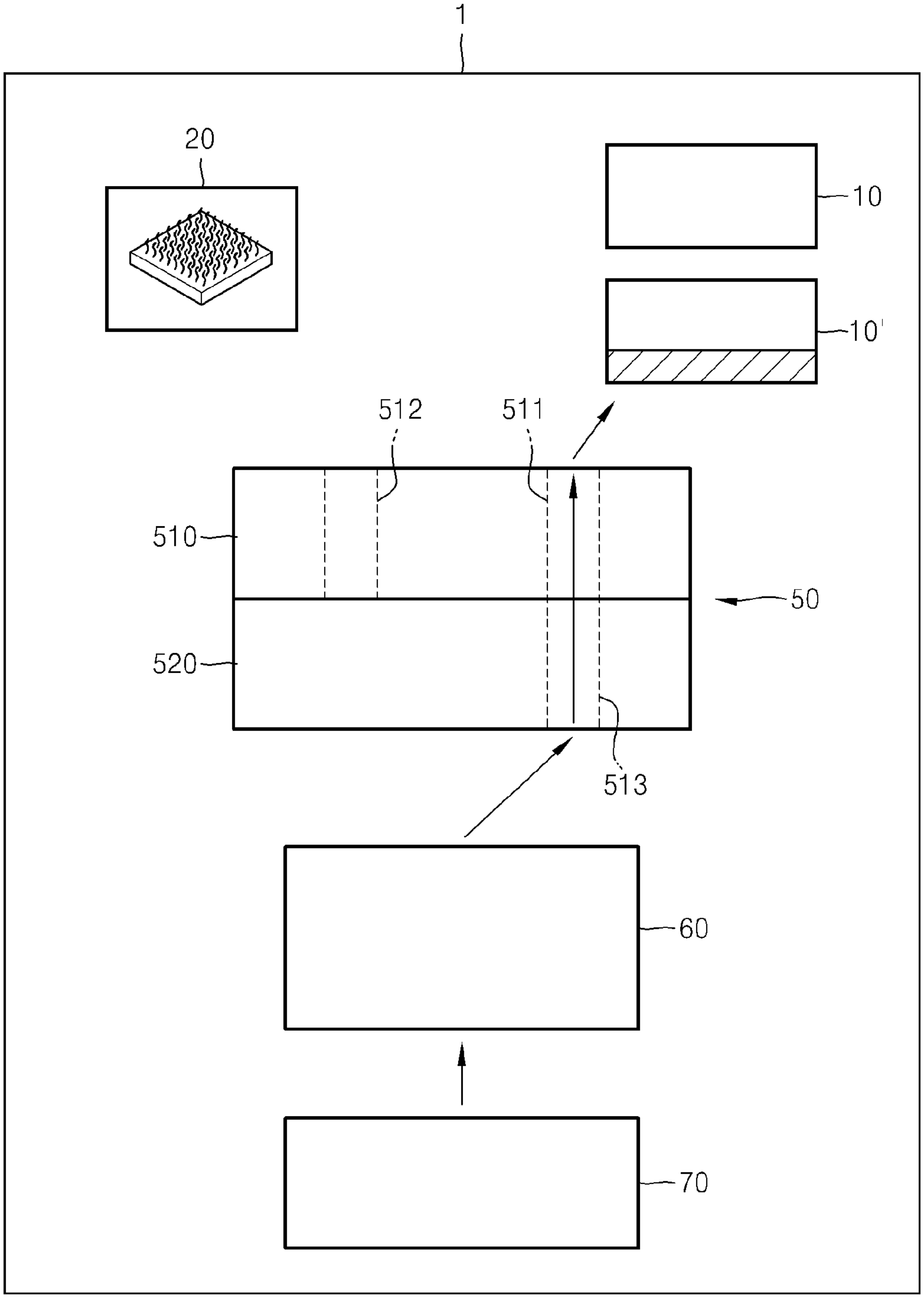
FIG. 9 illustrates an embodiment of a flow of fluid from a storing chamber to a fluid container in the microarray reaction device, according to the present invention.

FIG. 9 illustrates an embodiment of flow of fluid from the storing chamber 60 to the fluid container 10 in the microarray reaction device 1, according to the present invention.

The microarray reaction device 1 includes at least two of the fluid container 10, such as a first fluid container 10 and a second fluid container 10'. The first support unit 510 or the second support unit 520 is moved relative to the other unit, by sliding motion, and aligns and connects the third penetration opening unit 513 to the first penetration opening unit 511. When the pump 70 provides positive pressure (indicated by the up arrow between the storing chamber 60 and the pump 70) to the storing chamber 60, the fluid in the storing chamber 60 is transferred to the second fluid container 10' as indicated by the remaining arrows and the hatched feature within the second fluid container 10'. In this case, the second fluid container 10' may be a waste chamber, and the waste chamber may store fluid to be discharged after being used in the microarray reaction in the reaction chamber 20. Also, the second fluid container 10' may be connected to an outlet (not illustrated) for discharging gas used in the microarray reaction. Accordingly, the microarray reaction device 1 may control flow of fluid in both directions between at least two fluid containers 10 and 10', and the reaction chamber 20 by only one valve 50, one storing chamber 60, and one pump 70.

Figure 10:
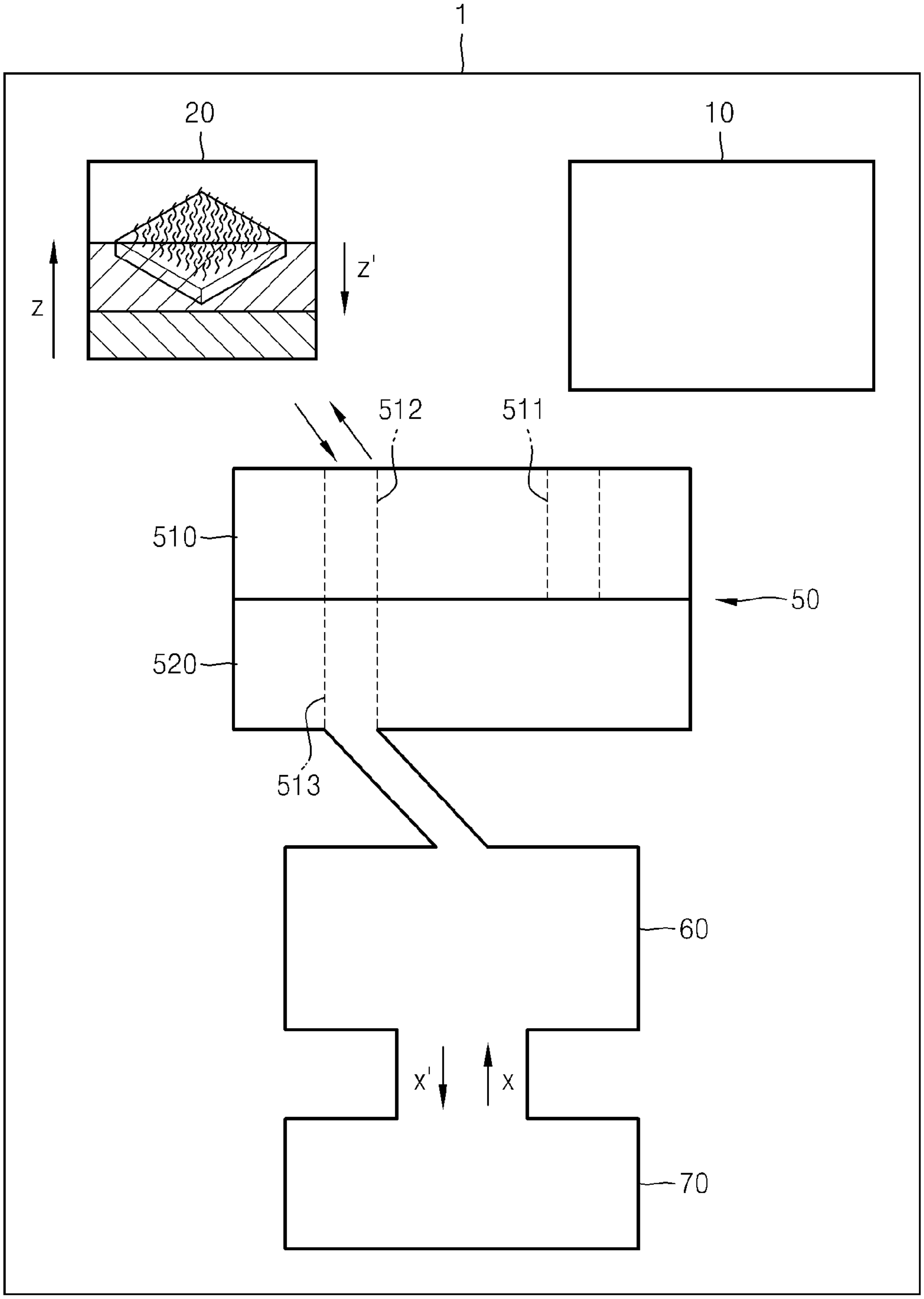
FIG. 10 illustrates an embodiment of an inflow/outflow of fluid in a reaction chamber of the microarray reaction device, according to the present invention.

FIG. 10 illustrates an embodiment of an inflow/outflow of fluid included in the reaction chamber 20 of the microarray reaction device 1, according to the present invention.

The first support unit 510 or the second support unit 520 is moved relative to the other unit, by sliding motion, and aligns and connects the third penetration opening unit 513 to the second penetration opening unit 512. When the pump 70 provides negative pressure (X' direction) to the storing chamber 60, the fluid in the reaction chamber 20 is removed therefrom. Then, when the pump 70 provides positive pressure (X direction) to the storing chamber 60, the fluid removed from the reaction chamber 20 is reentered to the reaction chamber 20. In this case, the fluid may be mixed or agitated by inflow (Z direction) and/or outflow (Z' direction) of the fluid in the reaction chamber 20. Here, the amount of inflow (Z direction) and/or outflow (Z' direction) of the fluid is controlled by the amount of positive (X direction) or negative (X' direction) pressure provided by pump.

Also, the fluid sensor 400 (not illustrated) positioned in the second channel 40 may monitor an amount of inflow (Z direction) and/or outflow (Z' direction) of the fluid by monitoring location of the fluid. In addition, the fluid flowing from the reaction chamber 20 may reach the second channel 40 (not illustrated), the second penetration opening unit 512, or the storing chamber 60. Inflow (Z direction) and/or outflow (Z' direction) of the fluid included in the reaction chamber 20 may be repeated.

As described above, according to the one or more of the above embodiments of the present invention, the microarray reaction device which may show excellent performance in the microarray reaction, is provided so as to efficiently perform the microarray reaction.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A microarray reaction device comprising:

a fluid container;

a reaction chamber separate from the fluid container and comprising a unit for positioning a microarray;

a first channel including a first end connected with the fluid container;

a second channel including a first end connected with the reaction chamber;

a valve comprising:

a first support unit including a first penetration opening unit and a second penetration opening unit extended through a first surface of the first support unit, wherein the first penetration opening unit is connected to a second end of the first channel opposing the first end, and the second penetration opening unit is connected to a second end of the second channel opposing the first end, and a second support unit including a third penetration opening unit extended through a second surface of the second support unit, wherein the first and second surfaces contact each other, such that the first support unit and the second support unit are slidably disposed with respect to each other such that the third penetration opening unit can be aligned and connected to the first or second penetration opening units by a sliding motion;

the device further comprising:

a storing chamber connected with the third penetration opening unit of the valve; and a pump connected to the storing chamber, wherein the pump provides positive or negative pressure to the storing chamber;

wherein, when the first penetration opening unit and the third penetration opening unit are aligned and connected to each other, such that the fluid container is connected with the storing chamber, the reaction chamber and the storing chamber are disconnected from each other;

and, when the second penetration opening unit and the third penetration opening unit are aligned and connected to each other, such that the reaction chamber is connected to the storing chamber, and the fluid container and the storing chamber are disconnected from each other.

2. The device of claim 1, wherein the fluid container contains liquid or gas for a microarray reaction.

3. The device of claim 1, wherein the unit for positioning a microarray comprises a microarray in which nucleic acid probes or polypeptide probes are fixed on a substrate thereof.

4. The device of claim 1, wherein the reaction chamber comprises a space for a microarray reaction.

5. The device of claim 1, wherein the first support unit is a ring shape comprising:

an outer surface through which the first penetration opening unit and the second penetration opening unit are extended, the outer surface connected to the first channel and the second channel; and an inner surface through which the first penetration opening unit and the second penetration opening unit are extended.

6. The device of claim 5, wherein the second support unit is a cylindrical shape comprising an outer surface which is slidably disposed with respect to the inner surface of the first support unit, such that the second support may be rotated in a clockwise or counterclockwise direction with respect to the first support unit, and when the first support unit and the second support unit of the valve are slid with respect to each other, the third penetration opening unit of the valve is positioned in the second support unit so that a direction of flow passing through a first end of the third penetration unit is substantially perpendicular to a direction of flow passing through a second end of the third penetration unit opposing the first end.

7. The device of claim 1, further comprising two or more fluid containers, two or more first channels, and two or more first penetration opening units, wherein each of the first penetration opening units is connected with one fluid container through one first channel.

8. The device of claim 1, further comprising two or more reaction chambers, two or more second channels, and two or more second penetration opening units, wherein each of the second penetration opening units is connected with one reaction chamber through one second channel.

9. The device of claim 1, wherein the pump is a syringe pump.

10. The device of claim 1, wherein the second channel further comprises a fluid sensor, the fluid sensor controlling an amount of fluid passing through the second channel.

11. The device of claim 1, wherein the reaction chamber further comprises:

a sample inlet unit through which sample solution is inflowed and outflowed;

a cover which covers the reaction chamber and a lock which locks the cover; and a heater, a cooler, or both a heater and a cooler, wherein the heater and the cooler control a temperature of the reaction chamber.

12. An analysis method using a microarray, the method comprising:

introducing fluid for a microarray reaction to a first fluid container of the microarray reaction device of claim 1, and installing the microarray in the unit for positioning a microarray of the reaction chamber;

moving the first support unit relative to the second support unit by sliding motion, and aligning and connecting the third penetration opening unit to the first penetration opening unit;

driving the pump to provide negative pressure to the storing chamber and transferring the fluid in the first fluid container to the storing chamber;

moving the first support unit relative to the second support unit by sliding motion, and aligning and connecting the third penetration opening unit to the second penetration opening unit; and driving the pump to provide positive pressure to the storing chamber and transmitting the fluid in the storing chamber to a first reaction chamber.

13. The method of claim 12, further comprising retransferring the fluid in the first reaction chamber to the storing chamber by driving the pump to provide negative pressure to the storing chamber.

14. The method of claim 13, wherein the microarray reaction device further comprises two or more fluid containers, and the method further comprises:

connecting a first end of the third penetration opening unit to the first penetration opening unit of the first support unit by sliding the first support unit relative to the second support unit, and transferring the fluid in the storing chamber to a second fluid container by driving the pump to provide positive pressure to the storing chamber.

15. The method of claim 12, further comprising pushing and pulling fluid in and out of the reaction chamber by driving the pump to provide positive and/or negative pressure to the storing chamber.

16. The method of claim 15, further comprising repeating the process of pushing and pulling fluid in and out of the reaction chamber.

17. The device of claim 1, wherein the first surface of the first support unit and the second surface of the second support unit are substantially parallel, planar surfaces, and the first support unit is moveable relative to the second support unit in a direction substantially parallel to the first surface.

18. The method of claim 12, wherein the first surface of the first support unit and the second surface of the second support unit are substantially parallel, planar surfaces, and the first support unit is moved relative to the second support unit in a direction substantially parallel to the first surface.

* * * * *